United States Patent
Jansen et al.

(10) Patent No.: US 7,594,377 B1
(45) Date of Patent: Sep. 29, 2009

(54) MEANS OF ADJUSTING GROUND SPEED OF A VEHICLE BASED ON LOAD ON BLADE ASSEMBLY

(75) Inventors: Lynn T. Jansen, Ames, IA (US); Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 433 days.

(21) Appl. No.: 11/553,497

(22) Filed: Oct. 27, 2006

(51) Int. Cl.
*A01D 34/47* (2006.01)

(52) U.S. Cl. .................................. 56/10.2 H
(58) Field of Classification Search .............. 56/10.2 R, 56/10.2 G, 11.1, 11.8, 14.7, 14.5, 17.5, 10.2 H; 172/2–7; 701/50
See application file for complete search history.

(56) References Cited

U.S. PATENT DOCUMENTS

| | | | |
|---|---|---|---|
| 5,394,678 A | 3/1995 | Lonn et al. | |
| 5,406,778 A | 4/1995 | Lamb et al. | |
| 5,447,019 A | 9/1995 | Held et al. | |
| 5,502,957 A | 4/1996 | Robertson | |
| 5,906,088 A | 5/1999 | Inui et al. | |
| 5,937,622 A | 8/1999 | Carrier et al. | |
| 6,339,916 B1* | 1/2002 | Benson | 56/10.2 R |
| 6,359,403 B1* | 3/2002 | Pollklas et al. | 318/432 |
| RE37,728 E * | 6/2002 | Kamm | 474/37 |
| 6,729,114 B2 | 5/2004 | Fillman et al. | |
| 6,826,895 B2 | 12/2004 | Iida et al. | |
| 6,857,253 B2 | 2/2005 | Reimers et al. | |
| 6,892,517 B2 | 5/2005 | Adams et al. | |
| 6,941,735 B1 | 9/2005 | Tamas | |
| 7,275,355 B2* | 10/2007 | Adams et al. | 56/10.2 H |

* cited by examiner

*Primary Examiner*—Robert E Pezzuto

(57) ABSTRACT

An assembly having a frame supported by a plurality of ground engaging wheels. Mounted to the frame is an operator control system that is connected to a controller that is powered by an electrical source. The controller is operatively connected to a blade assembly and a ground drive assembly and adjusts the ground speed of the assembly based upon the cutting load of the blade.

12 Claims, 4 Drawing Sheets

MEANS OF ADJUSTING GROUND SPEED OF A VEHICLE BASED ON LOAD ON BLADE ASSEMBLY

BACKGROUND OF THE INVENTION

This invention is directed to a vehicle assembly and more specifically to an assembly that adjusts ground speed based upon the load on a blade assembly.

Riding mowers are known in the art. Most riding mowers are driven mechanically by an internal combustion engine. These engines provide power to both a cutting blade assembly and a drive wheel assembly through adjustable ratio mechanical gearing systems such as variable ratio V-belts and the like. These mowers present certain drawbacks. Not only are these mowers expensive to manufacture, but they produce exhaust fumes and may leak hydraulic fluids that damage the turf.

Electrically powered mowers have addressed some of the these drawbacks. Still, due to power limitations, operators must exercise caution by reducing ground speed so as not to overload the cutting blade motor when heavy or tall grass is encountered that could stall the motor. Accordingly there exists a need in the art for an assembly and system that addresses these deficiencies.

An objective of the present invention is to provide an assembly that adjusts ground speed based upon the load on the blade.

Another objective is to provide an electrically powered assembly that is more efficient in its operation.

These and other objectives will be apparent to those skilled in the art based upon the following written description.

SUMMARY OF THE INVENTION

An assembly having a frame supported by a plurality of ground engaging wheels. Mounted to the frame is an operator control system that is connected to a controller that is powered by an electrical source. The controller is operatively connected to a blade assembly and a ground drive assembly and adjusts the ground speed of the assembly based upon the cutting load of the blade.

DETAILED DESCRIPTION OF THE PREFERRED EMBODIMENT

Figure 1:
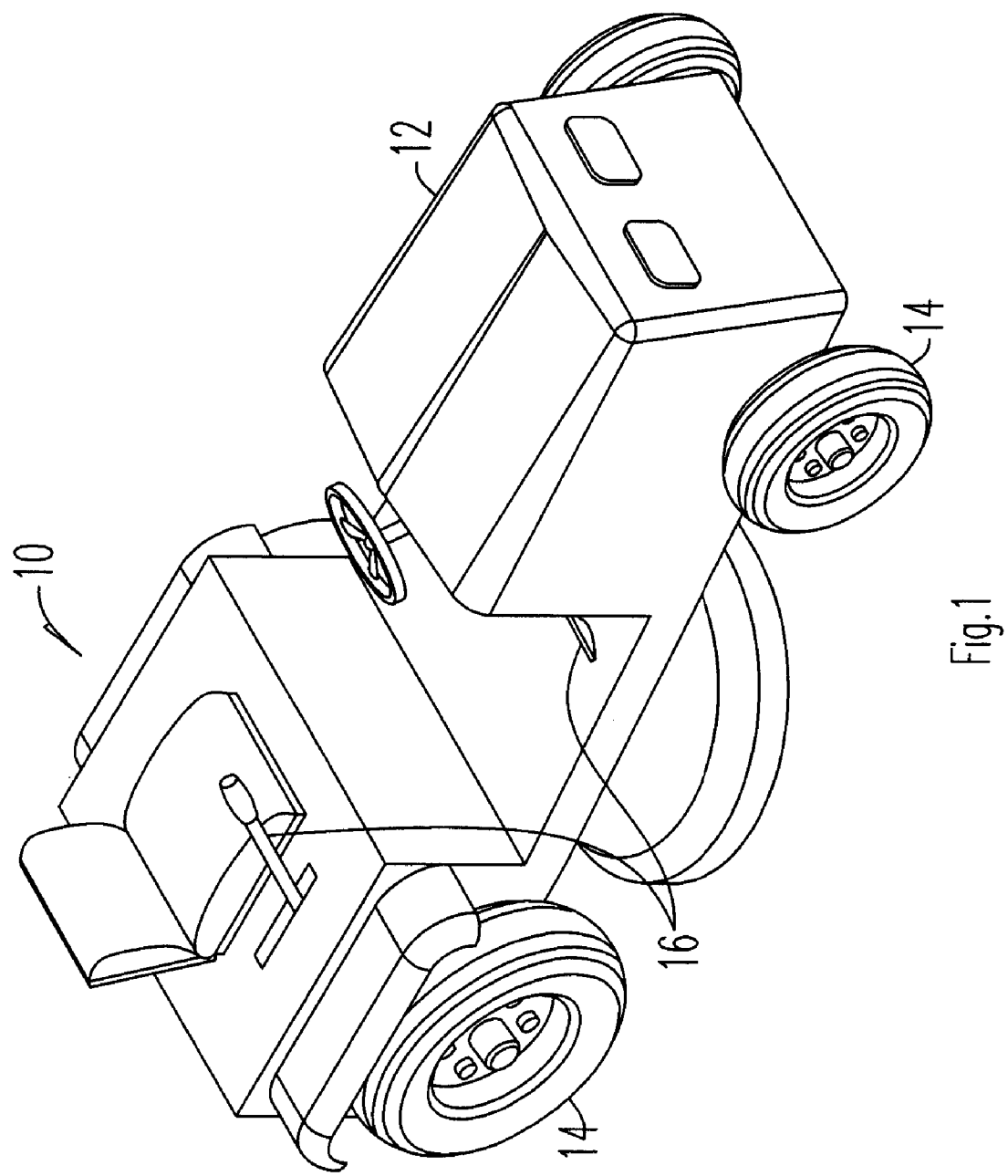
FIG. 1 is a perspective view of a vehicle assembly.
Figure 2:
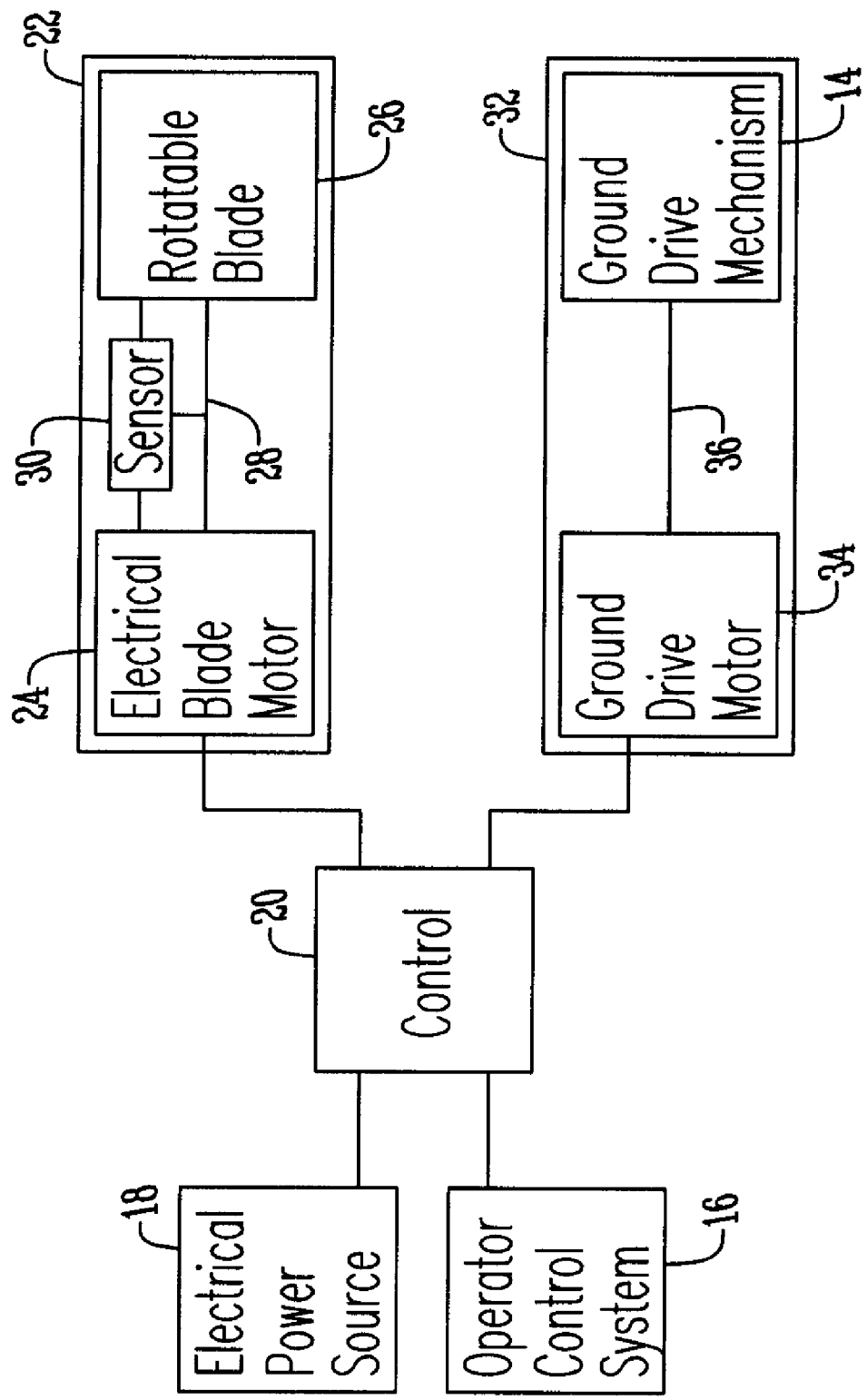
FIG. 2 is a schematic view of a vehicle assembly that adjusts ground speed based on cutting load of a blade assembly.

Referring to the Figures the self-propelled mower assembly 10 has a frame 12 supported by a plurality of ground engaging wheels 14. For purposes of example only, the present invention is shown with regard to a riding mower. The invention may, however, be used for other applications, such as crop harvesting, hedge trimming, other vegetation maintenance, and the like. Mounted on the frame 12 is an operator control system 16 which includes conventional elements for operating a mower 10 such as a steering wheel and mechanism, control module, drive and brake pedals, mower activation and the like. Also mounted to the frame 12 is an electrical power source 18. The electrical power source may be of any type such as a generator, battery, power cord or the like. Both the operator system 16 and the electrical power source 18 are connected to a controller 20 mounted on the frame. The controller 20 is powered by the electrical power source 18 and receives input signals from the operator control system 16 related to the operation of the mower 10.

Electrically connected to the controller is a mounting blade assembly 22. The blade assembly includes an electrical blade motor 24 that is operably connected to a rotatable blade 26 by a drive shaft 28. Mounted to the assembly 22 is a sensor 30 that detects the rotational speed of the blade 26. The blade is of any type such as a rotary blade, reel type blade, or the like.

A ground drive assembly 32 is also electrically connected to the controller 20. The ground drive assembly 32 includes an electrical ground drive motor 34 that is operably connected to a ground drive mechanism such as wheel 14 by a ground drive shaft 36.

In operation the mower is activated through the operator control system 16. From signals sent from the operator control system 16 to the controller 20 the ground drive assembly 32 and the mowing blade assembly 22 are both activated to move the mower 10 in a forward and rearward direction and rotate the blade 26 respectively. The sensor 30 monitors the rotational speed of the blade 26 and/or drive shaft 28 and provides a signal to the controller that indicates the rotational speed.

When the blade 26 encounters a load (i.e. heavy grass) the rotational speed of the blade 26 will decrease and a signal indicating the decrease will be sent from the sensor 30 to the controller 20. The controller 20 will compare the sensed speed with a pre-determined normal speed. Alternatively, the controller 20 may be configured to sense the cutting load on the blade 26 through measurement of torque or estimate the cutting load through measurements or estimates of electrical current that is drawn by the blade powering motor. When the controller 20 determines that the sensed speed is less than the predetermined normal speed or that the cutting load is higher than a predetermined value the controller 20 will send a signal to the ground drive motor 34 that will reduce the rotation of the ground drive shaft 36 and in turn the ground speed of the mower. As a result, the load on the blade 26 will be reduced, the cutting performance will be improved, and less stress and wear on the blade assembly 22 will be encountered.

Figure 3:
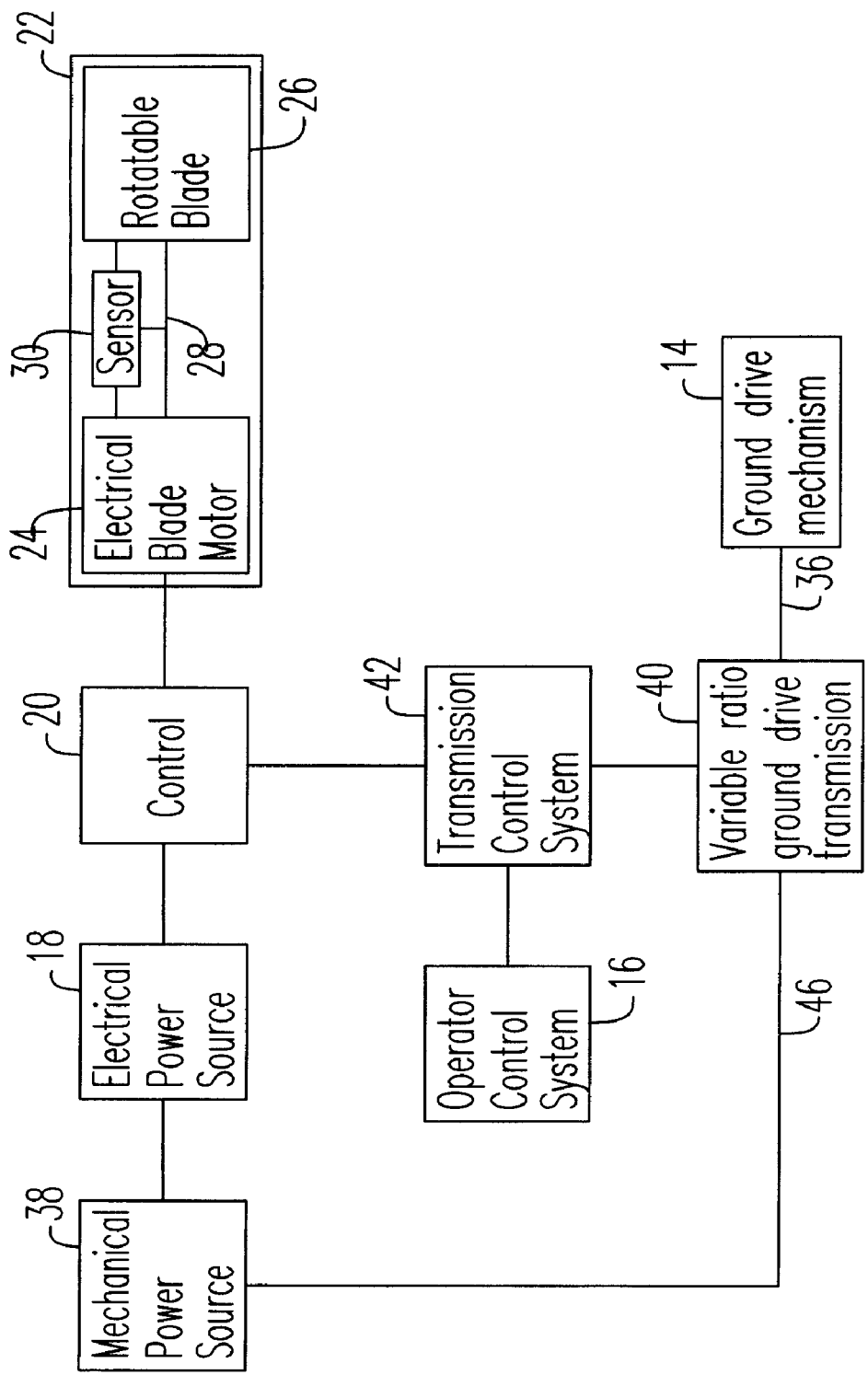
FIG. 3 is a schematic view of a vehicle assembly that adjusts ground speed based on cutting load of a blade assembly.
Figure 4:
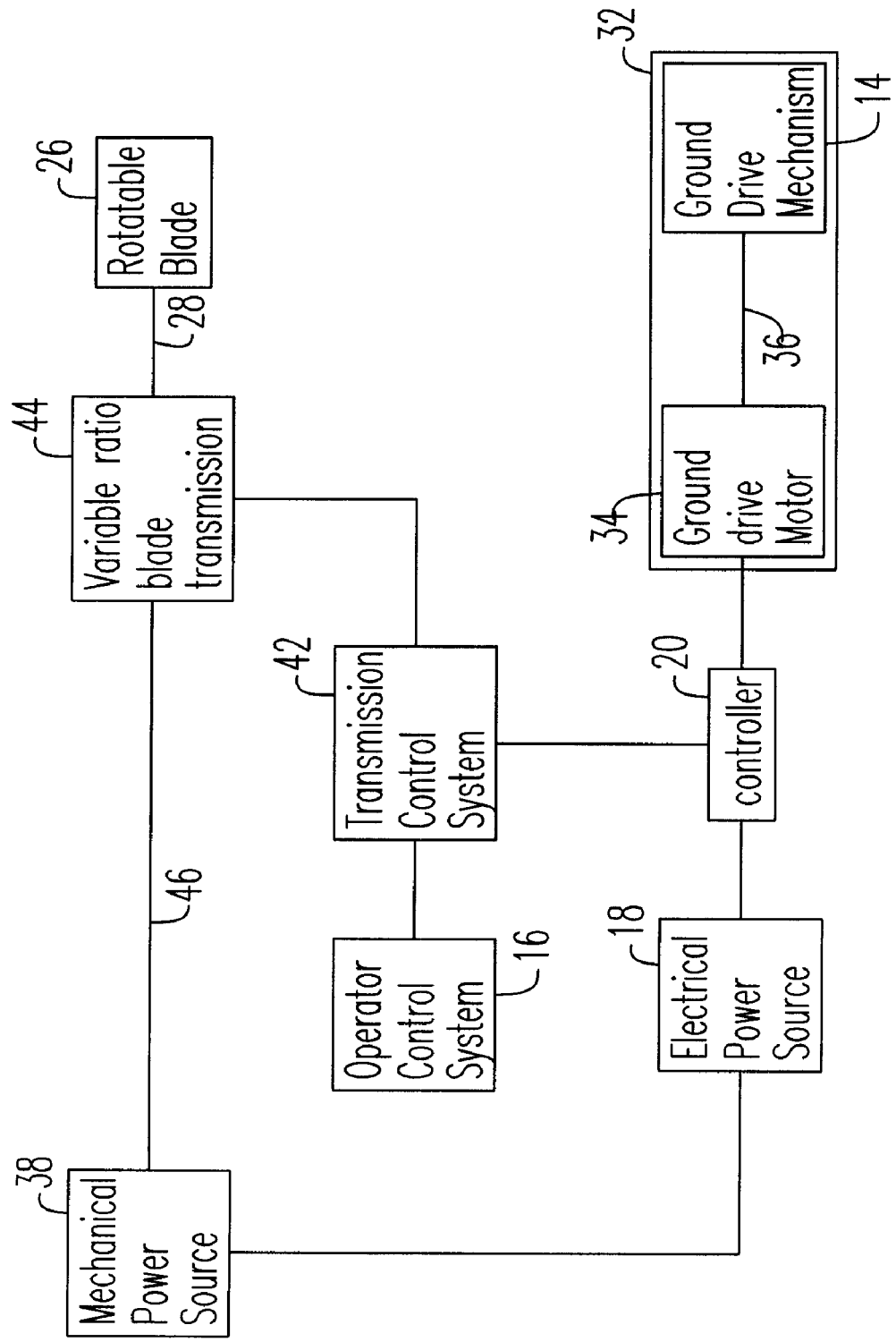
FIG. 4 is a schematic view of a vehicle assembly that adjusts ground speed based on cutting load of a blade assembly.

In an alternative embodiment, as shown in FIG. 3, a hybrid system which combines mechanical and electrical drive concepts is used. Specifically, a mechanical power source 38 is connected to and provides power to the electrical power source 18 (i.e., generator, alternator, etc.). The mechanical power source 38 is also operably connected to a variable ratio ground drive transmission 40 which is operably connected to the ground drive mechanism 14 by ground drive shaft 36.

In this embodiment, the operator control system 16 is connected to a transmission control system 40. The transmission control system 40 is connected to controller 20 and sends to and receives signals from the controller. The transmission control system 42 is also connected to the variable ratio ground drive transmission. The blade assembly 22 is similarly connected to and controlled by the controller 20 as previously described. When the controller 20 determines that the speed of the blade is less than the pre-determined normal speed or that the cutting load is higher than a predetermined value a signal is sent to the transmission control system 42 which in turn adjusts the variable ratio ground drive transmission 40 such that the ground speed of the mower 10 is reduced.

In another hybrid embodiment, the mechanical power source 38 drives the blade 26 through a variable ratio blade transmission 44. Specifically, the mechanical power source 38 is operably connected to the variable ratio blade transmission 44 by drive shaft 46. The variable ratio blade transmission 44 is operably connected to the blade 26 by drive shaft 28.

In addition to driving the blade 26, the mechanical power source 38 supplies power to the electrical power source 18 which is electrically connected to controller 20. The controller 20 is connected to the ground drive assembly as set forth in the first described embodiment.

The operator control system 18 is connected to the transmission control system 42 which is connected to both the variable ratio blade transmission 44 and the controller 20. In this embodiment, a signal is received by the controller 20 through the transmission control system 42 that indicates either rotational speed or mechanical load of the blade. When the signaled speed is less than the pre-determined normal speed or when the cutting load is too high the controller 20 sends a signal to the ground drive assembly 32 that in turn reduces the ground speed of the mower.

Therefore, a self-propelled mower assembly that reduces the ground speed of a mower when the blade encounters a load has been disclosed that, at the very least, meets all the stated objectives.

What is claimed is:

1. A grass cutting assembly comprising:
   a frame supported by a plurality of ground engaging wheels,
   an operator control system mounted to the frame and connected to a controller that is powered by an electrical power source, the controller operatively connected to a blade assembly and a ground drive assembly wherein the controller adjusts ground speed produced by the ground speed assembly based upon cutting load of the blade assembly when a load is encountered,
   wherein the blade assembly includes an electrical blade motor that sends signals to the controller.

2. The assembly of claim 1 wherein the blade assembly includes a blade motor operably connected to a rotatable blade.

3. The assembly of claim 1 wherein the ground drive assembly includes a ground drive mechanism operably connected to the wheels.

4. The assembly of claim 1 wherein the ground speed of the assembly is reduced when the controller determines that sensed rotational speed of the blade assembly is less than a pre-determined speed.

5. The assembly of claim 1 wherein the ground speed of the assembly is reduced when the controller determines that sensed cutting load on the blade assembly is greater than a pre-determined value.

6. A grass cutting assembly, comprising:
   a frame supported by a plurality of ground engaging wheels;
   a mechanical power source mounted to the frame that supplies power to an electrical power source and a variable ratio ground drive transmission;
   a transmission control system connected to the variable ratio ground drive transmission and a controller,
   the controller connected to a blade assembly and the variable ratio ground drive transmission operably connected to the wheels, wherein the controller adjusts ground speed of the assembly through the transmission control system based upon cutting load of the blade assembly when a load is encountered,
   wherein the blade assembly includes an electrical blade motor that sends signals to the controller.

7. The assembly of claim 6 wherein the blade assembly includes a blade motor operably connected to a rotatable blade.

8. The assembly of claim 6 wherein the ground speed of the assembly is reduced when the controller determines that sensed rotational speed of the blade assembly is less than a pre-determined speed.

9. The assembly of claim 6 wherein the ground speed of the assembly is reduced when the controller determines that sensed cutting load on the blade assembly is greater than a pre-determined value.

10. A grass cutting assembly, comprising:
    a frame supported by a plurality of ground engaging wheels;
    a mechanical power source mounted to the frame that supplies power to an electrical power source and a variable blade transmission which is operably connected to a rotational blade;
    a transmission control system connected to a variable ratio blade transmission and a controller; the controller connected to a ground drive assembly wherein the controller adjusts ground speed of the assembly based upon the cutting load of the rotational blade when a load is encountered,
    wherein the ground drive assembly includes an electrical ground drive motor that sends signals to the controller.

11. The assembly of claim 10 wherein the ground drive assembly includes a ground drive motor operably connected to the wheels.

12. The assembly of claim 10 wherein the ground speed of the assembly is reduced when the controller determines that sensed rotational speed of the blade assembly is less than a pre-determined speed.

* * * * *